ID=19

United States Patent
Picht et al.

[11] Patent Number: 6,013,979
[45] Date of Patent: Jan. 11, 2000

[54] PHOSPHOR COMPOSITION WITH A COATING OF COLLOIDAL SiO$_2$ PARTICLES AND AN OXYGEN COMPOUND OF MAGNESIUM, CALCIUM, BARIUM, ZINC, OR ALUMINUM

[75] Inventors: Friederike Picht, Düren; Michael Bredol; Joachim Opitz, both of Aachen, all of Germany; Frans Vollebregt, Waalre, Netherlands

[73] Assignee: U.S. Philips Corporation, New York, N.Y.

[21] Appl. No.: 08/878,918

[22] Filed: Jun. 19, 1997

[30] Foreign Application Priority Data

Jun. 29, 1996 [DE] Germany .......................... 196 26 219

[51] Int. Cl.$^7$ .............................. H01J 29/10; H01J 31/00; C09K 11/08; C09K 11/54
[52] U.S. Cl. ..................... 313/467; 313/469; 313/477 R; 313/479; 313/480; 252/301.4 R; 252/301.6 R; 427/212; 427/215; 427/219; 427/242
[58] Field of Search ....................................... 313/655, 461, 313/466, 467–69, 477 R, 479–80, 488–87, 496, 502–4, 485–86; 252/301.4 R, 301.6 R; 428/403, 404; 427/212, 215, 219, 242; 430/23, 25–28; 106/400, 401, 438, 481, 483–84

[56] References Cited

U.S. PATENT DOCUMENTS 5,366,834 11/1994 Yoneda et al. .......................... 430/23

*Primary Examiner*—Nimeshkumar D. Patel
*Assistant Examiner*—Mack Haynes

[57] ABSTRACT

The invention relates to a display screen having a phosphor layer of a phosphor composition of a phosphor coated with an oxygen compound of one of the elements magnesium, calcium, barium, zinc and aluminium, and with colloidal SiO$_2$ having an average particle size of 70 nm$\leq$d$\leq$130 nm. The invention further relates to a phosphor composition of a phosphor coated with an oxygen compound of one of the elements magnesium, calcium, barium, zinc and aluminium, and with colloidal SiO$_2$ having an average particle size of 70$\leq$d$\leq$130 nm, and to a method of manufacturing the phosphor composition.

8 Claims, 2 Drawing Sheets

PHOSPHOR COMPOSITION WITH A COATING OF COLLOIDAL SIO₂ PARTICLES AND AN OXYGEN COMPOUND OF MAGNESIUM, CALCIUM, BARIUM, ZINC, OR ALUMINUM

BACKGROUND OF THE INVENTION

The invention relates to a display screen, in particular a color display screen for a cathode ray tube, having a phosphor layer comprising a phosphor composition of a phosphor coated with an oxygen compound of one of the elements magnesium, calcium, barium, zinc and aluminium, and with colloidal $SiO_2$.

Display screens are provided on the inner surfaces thereof with a structured phosphor layer which contains one or more phosphors arranged in a dot pattern or stripe pattern. In the case of color display screens, the pattern consists of triplets of vertical stripes or triangularly arranged dots, each triplet containing phosphors in the primary emission colors red, blue and green.

This structured phosphor layer is customarily provided in a photochemical process which is based, in a wet-chemical process, on photo-sensitive phosphor suspensions or, in a dry process, on photo-sensitive phosphor lacquers.

The photo-sensitive phosphor suspensions for the wet-chemical process are composed of a suspension of the phosphor as a powder in water and of polyvinyl alcohol and ammonium dichromate as the photo-active system. These photo-sensitive suspensions are cured by exposure to UV light.

Said phosphor suspensions must be resistant to agglomeration and exhibit favorable sedimentation properties. However, the customarily used raw materials for the phosphors are difficult to suspend in aqueous systems, either because they are hydrophobic in character or because the phosphor grains have formed agglomerates. Therefore, to make them readily suspendible, the raw phosphor powders are subjected to a pretreatment in which the surface is modified; for example, they may be provided with a hydrophilic coating.

In U.S. Pat. No. 5,366,834, a description is given of a coating for improving the dispersibility of phosphors, which coating is applied to a first coating and comprises Zn, Al and/or an alkaline earth metal as well as colloidal silicon oxide, an aluminium oxide sol and/or a titanium-oxide sol having a particle size of 50 nm or less. In accordance with U.S. Pat. No. 5,366,834, column 7, lines 34 to 40, said coating should have a structure in which a hydroxide of Zn, Al and/or an alkaline earth metal with $SiO_2 \cdot nH_2O$ ($n \geq 0$), $Al_2O_3 \cdot nH_2O$ ($n \geq 0$) or $TiO_2 \cdot nH_2O$ are mixed and bonded to the first coating. It is also assumed that the coating is a silicate or an oxide which is formed when the metal ions and, for example, the colloidal $SiO_2$ are concurrently precipitated.

The quality of display screens is to meet ever higher requirements in terms of brightness, color purity, absence of haziness and definition of the phosphor coating.

OBJECTS AND SUMMARY OF THE INVENTION

Therefore, it is an object of the invention to provide a display screen having a phosphor layer, which is characterized by an optimal brightness, definition, adhesion as well as a minimum level of color impurity and absence of haziness. To achieve this, phosphor compositions yielding very stable suspensions are required.

In accordance with the invention, this object is achieved by a display screen having a phosphor layer comprising a phosphor composition of a phosphor coated with an oxygen compound of one of the elements magnesium, calcium, barium, zinc and aluminium, and with colloidal $SiO_2$ having an average particle size of 70 nm$\leq$d$\leq$130 nm.

Such a display screen is characterized by a surprising improvement in color purity, absence of haziness, and brightness of the display screen. Such a display screen has a high and homogeneous phosphor concentration in the structured phosphor layer and the individual phosphor dots have sharp contours. In spite of the non-continuous surface morphology of the phosphor particles, which is brought about by the coarse-grained coating, the phosphor layer adheres very well to the glass of the display screen, is homogeneous, dense and free of pinholes.

Within the scope of the invention it is preferred that the oxygen compound is a zinc-oxygen compound. Said zinc-oxygen compound serves as an inorganic network former and, due to its binder properties, improves the adhesion of the relatively large colloidal $SiO_2$ particles to the surface of the phosphor grains.

It is particularly preferred that the phosphor coating comprises a zinc-oxygen compound and colloidal $SiO_2$ in the molar ratio of 5:2 to 1:20.

It is further preferred that the colloidal $SiO_2$ has a monodisperse particle size. By virtue thereof, the phosphor composition obtains a surface morphology which is characterized by individual, large, only weakly agglomerated and homogeneously distributed colloidal $SiO_2$ particles, and which provides the phosphor composition with a very high suspension-stability. Phosphor layers comprising such phosphor compositions exhibit a surprisingly low level of haziness.

It may alternatively be preferred that the coating contains a color-filter pigment.

It may further be preferred that the phosphor composition contains a color-filter pigment in a separate coating.

The invention also relates to a phosphor composition of a phosphor coated with an oxygen compound of one of the elements magnesium, calcium, barium, zinc and aluminium, and with colloidal $SiO_2$ having an average particle size of 70$\leq$d$\leq$130 nm.

Such a phosphor composition has good processing properties because it can be filtered readily, has a small sediment volume and forms a semi-solid sediment. The particle size distribution of the suspension of the phosphor composition is insensitive to ultrasound. A particularly advantageous characteristic is that the inclination of the phosphor composition to adhere to the unexposed regions of the surface of the display screen is small, which results in a substantial reduction of haziness relative to the prior art.

The invention further relates to a method of manufacturing a display screen, in which a) in a wet-chemical grinding process, the phosphor is dispersed in the aqueous solution of an ionic silicate,
b) the aqueous solution of a monodispersed or polydispersed $SiO_2$ colloid having a particle size of 70$\leq$d$\leq$130 nm is added to the phosphor-suspension thus obtained,
c) the aqueous solution of a salt of one of the elements magnesium, calcium, barium, zinc and aluminium, and an oxo acid of the phosphor-suspension are added,
d) the pH-value of the phosphor suspension is increased to pH$\geq$9,
e) the phosphor suspension is washed, filtered and dried.

This method enables phosphors to be tenaciously coated with colloidal $SiO_2$ having a large particle diameter.

These and other aspects of the invention will be apparent from and elucidated with reference to the embodiments described hereinafter.

DESCRIPTION OF THE PREFERRED EMBODIMENTS

Figure 1:
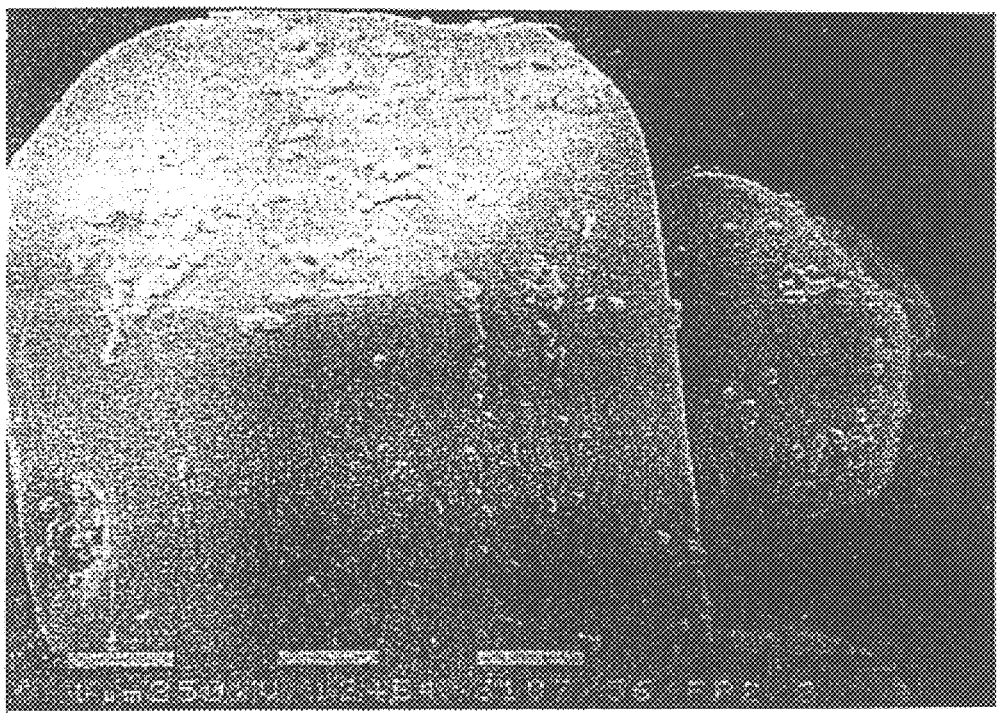
FIG. 1 shows SEM recordings of a ZnS:Cu,Au,Al-phosphor coated with a monodisperse $SiO_2$ colloid having a particle size of 100 nm and with ZnO.

For the phosphor composition in accordance with the invention, all customary phosphors can be used as the starting material, for example, blue ZnS:Ag,Al or ZnS:Ag,Cl, green ZnS:Cu,Au,Al, green ZnS:Cu,Al or red Y2O2S:Eu. For the starting material use can alternatively be made of an already pigmented phosphor which is coated with color-filter pigments to improve the picture contrast, for example, ZnS:Ag pigmented with CoAl2O4 or Y2O2S:Eu pigmented with Fe2O3.

The coating on the phosphor comprises an oxygen compound of one of the elements magnesium, calcium, barium, zinc and aluminium. Within the scope of the invention, an "oxygen compound" is to be understood to include the hydroxides and oxides of these elements.

The coating on the phosphor further comprises colloidal $SiO_2$ having an average particle size between 70 nm and 130 nm. Preferably, use is made of $SiO_2$ colloids having a monodisperse particle size. Alternatively, however, use may be made of polydisperse colloids.

The molar ratio between the quantities of oxygen compound and colloidal $SiO_2$ in the coating can be varied in a wide range from 5:2 to 1:20. The weight ratio between the coating and the phosphor in the phosphor composition may range from 0.1 wt. % to 1.5 wt. %.

To manufacture the phosphor composition in accordance with the invention, the following process steps are successively carried out:

a) in a wet-chemical grinding process, the raw phosphor powder is properly dispersed in a very small quantity of an aqueous solution of an ionic silicate, for example $K_2SiO_3$, $Na_2SiO_3$.

The quantity of ionic silicate (calculated as $SiO_2$) customarily ranges from 0.005 wt. % to 0.05 wt. %, calculated with respect to the phosphor.

b) the aqueous solution of a suspended monodisperse or polydisperse $SiO_2$ colloid having an average particle size in the range from 70 to 130 nm is added to this phosphor suspension, the quantity of $SiO_2$ generally ranging from 0.1 wt. % to 1 wt. %, calculated with respect to the raw phosphor and the pH-value of the phosphor suspension is reduced to pH≦6 by means of a diluted acid, for example $HNO_3$, $CH_3COOH$, $H_2SO_4$.

c) the aqueous solution of a water-soluble salt of one of the elements magnesium, calcium, barium, zinc or aluminium, for example the acetates, nitrates, sulphates or chlorides, is added to the phosphor suspension in a quantity which corresponds to 0.010 wt. % to 1.00 wt. % of the oxygen compound, calculated with respect to the phosphor.

d) the pH-value of the phosphor suspension is increased to pH>9 by means of an ammoniac solution, a sodium hydroxide solution or potassium hydroxide solution, which is stirred for some time.

e) subsequently, the phosphor thus coated is allowed to sediment, whereafter it is decanted, washed a number of times and filtered off and the phosphor composition is dried in air at 140° C. for approximately 15 hours.

If necessary, the wet-chemical pigmentation of the phosphor can be carried out between process step a) and process b), for example, as a precipitation reaction or a colloid-chemical reaction. After the pigmentation operation, the phosphor suspension is washed and the pH-value is adjusted so that 7≦pH≦8.5, whereafter said suspension is subjected to further processing in process step b).

In step c) of this coating process, the individual particles of the $SiO_2$ colloid are separated from each other by reducing the pH-value, so that said particles are disagglomerated and homogeneously distributed in the suspension. After the addition of a salt solution in step d), the pH-value is increased to pH≧9 in step e) and the $SiO_2$ colloid particles present in the suspension along with the precipitated oxygen compounds are homogeneously deposited on the surface of the phosphor particles. By virtue of this method, a surprisingly tenacious coating is formed on the phosphor, in spite of the fact that the $SiO_2$ particles are very large.

To manufacture the phosphor suspensions for the manufacture of display screens, the individual components, such as phosphor, water, binding agents, dispersing agents, light-sensitive components, anti-foaming agents, etc., are mixed in a specific order and concentration, which is governed by the phosphor used and the processing conditions of the suspension.

The display screen in accordance with the invention can be manufactured, for example, in accordance with the so-called "flow coating" method:

a) the phosphor composition is dispersed in a binder solution on the basis of, for example, polyvinyl alcohol (PVA), which solution is photo-activated by means of, for example, ammonium dichromate (ADC).

b) the suspension of the phosphor composition is provided on the inner surface of the display-screen glass, uniformly distributed thereon by rotating the display screen and any excess suspension is removed by centrifuging.

c) the dried phosphor layer is irradiated through a mask by means of UV light, thereby causing the irradiated regions of the phosphor layer to cure.

d) the display screen is developed by means of warm water, the regions of the phosphor layer which have not been irradiated with UV light being removed.

e) the phosphor layer is dried.

f) the process steps a)–e) are successively carried out for all three primary colors.

g) the display screen is burned-in at a temperature of approximately 400° C. The burn-in temperature may be higher if the sintering of the pigments precipitated during the coating process necessitates such a higher temperature.

EXAMPLE 1

ZnS:Cu,Au,Al with 0.31 wt. % colloidal $SiO_2$ and 0.42 wt. % ZnO.

a) Dispersing of the phosphor.

A quantity of 1 kg of green-luminescent phosphor ZnS:Cu,Au,Al is washed and sieved, whereafter 100 ml water is added and its pH-value is adjusted to 9.0 by means of diluted ammonia. After the addition of 2.05 ml of a 0.5 molar $K_2SiO_3$-solution (0.0062 wt. % $SiO_2$, calculated with respect to the Zns-phosphor) a pH-value of 10.7 is achieved. This suspension is subjected to a wet-grinding operation for 3 hours. After the removal of the grinding media, and after the addition of a further quantity of 1.68 l water and wet-sieving of the suspension through a fine sieve, the stabilized phosphor suspension can be stored for up to 24 hours, also during sedimentation of the phosphor.

b) Coating of the phosphor.

A quantity of 103 ml of a 0.5 molar solution of the monodisperse $SiO_2$-colloid Monospher® 100 (E. Merck) having a particle size of 100 nm are added to the properly dispersed, alkaline suspension of the ZnS:Cu,Au,Al-phosphor having a pH-value of 8.5. The pH-value is reduced to pH=4.5 by means of a 1 molar $CH_3COOH$ solution. A quantity of 103 ml of a 0.5 molar $Zn(NO_3)_2$-solution are added. The pH-value is increased to pH=9.0 by means of a 3 molar ammonia solution. After stirring for 15 minutes, the suspension of the coated ZnS:Cu,Au,Al-phosphor is allowed to sediment, whereafter it is decanted and washed several times. Finally, the coated phosphor is filtered off and dried in air at 140° C. for approximately 15 hours.

EXAMPLE 2

ZnS:Cu,Au,Al with 0.25 wt. % colloidal $SiO_2$ and 0.084 wt. % ZnO a) Dispersing of the phosphor A quantity of 1 kg of a green-luminescent phosphor ZnS:Cu,Au,Al is dispersed as described in example 1, in a $K_2SiO_3$-solution.

b) Coating of the phosphor

A quantity of 82.1 ml of a 0.5 molar solution of the polydisperse $SiO_2$-colloid Syton® W (Dupont de Nemours) having an average particle size of 73 nm are added to the properly dispersed alkaline suspension of the ZnS:Cu,Au,Al-phosphor having a pH-value of 8.4. The pH-value is reduced to pH=4.0 by means of an 1 molar $HNO_3$-solution. A quantity of 20.5 ml of a 0.5 molar $Zn(NO_3)_2$-solution are added. The pH-value is increased to pH=9.0 by means of a 3 molar ammonia solution. After stirring for 30 minutes, the suspension of the coated ZnS:Cu,Au,Al is allowed to sediment, whereafter it is decanted and washed a number of times. Finally, the coated phosphor is filtered off and dried in air at 140° C. for approximately 15 hours.

EXAMPLE 3

ZnS:Ag,Al with 0.30 wt. % $SiO_2$ and 0.025 wt. % $Al_2O_3$.

a) Dispersing of the phosphor

A quantity of 1 kg of blue-luminescent ZnS:Ag,Al is dispersed as described in example 1, in a $K_2SiO_3$-solution.

b) Coating of the phosphor.

A quantity of 99.9 ml of a 0.5 molar solution of the polydisperse $SiO_2$-colloid Syton® W-solution (Dupont de Nemours) having an average particle size of 76 nm are added to the properly dispersed alkaline suspension of the ZnS:Ag,Al-phosphor having a pH-value of 8.5. The pH-value is reduced to pH=5.5 by means of a 0.5 molar $H_2SO_4$-solution. A quantity of 4.99 ml of a 0.5 molar $Al_2(SO_4)_3$-solution are added. The pH-value is increased to pH=9.0 by adding a 3 molar ammonia solution. After stirring for 30 minutes, the suspension of the coated ZnS:Ag,Al phosphor is allowed to sediment, whereafter it is decanted and washed a number of times. Finally, the coated phosphor is filtered off and dried in air at 140° C. for approximately 15 hours.

EXAMPLE 4

Coating of CoA1204-pigmented ZnS:Ag,Cl with 0.35 wt. % $SiO_2$ and 0.099 wt. % $Ba(OH)_2$.

a) Dispersing of the phosphor

A quantity of 1 kg of a blue-luminescent, CoA1204-pigmented ZnS:Ag,Cl is dispersed as described in example 1, in a $K_2SiO_3$-solution.

b) Coating of the phosphor.

A quantity of 117 ml of a 0.5 molar solution of the monodisperse $SiO_2$-colloid Monospher® 100 (E. Merck) having a particle size of 100 nm is added to the properly dispersed, alkaline suspension of the pigmented ZnS:Ag,Cl-phosphor having a pH-value of 8.5. The pH-value is reduced to pH=4.5 by means of a 1 molar acetic-acid solution. A quantity of 11.7 ml of a 0.5 molar barium-acetate solution are added. The pH-value is increased to pH=10.5 by means of an 1 molar KOH-solution. After stirring for 30 minutes, the suspension of the coated ZnS:Ag,Cl phosphor is allowed to sediment, whereafter it is decanted and washed several times. Finally, the coated phosphor is filtered off and dried in air at 140° C. for approximately 15 hours.

Characterization.

A ZnS:Cu,Au,Al-phosphor composition in accordance with example 1 is compared with a reference sample which was manufactured in accordance with the same method, yet subjected to a surface treatment with ionic $SiO_2$ of $K_2SiO_3$ followed by $Zn(OH)_2$/ZnO-precipitation.

Figure 2:
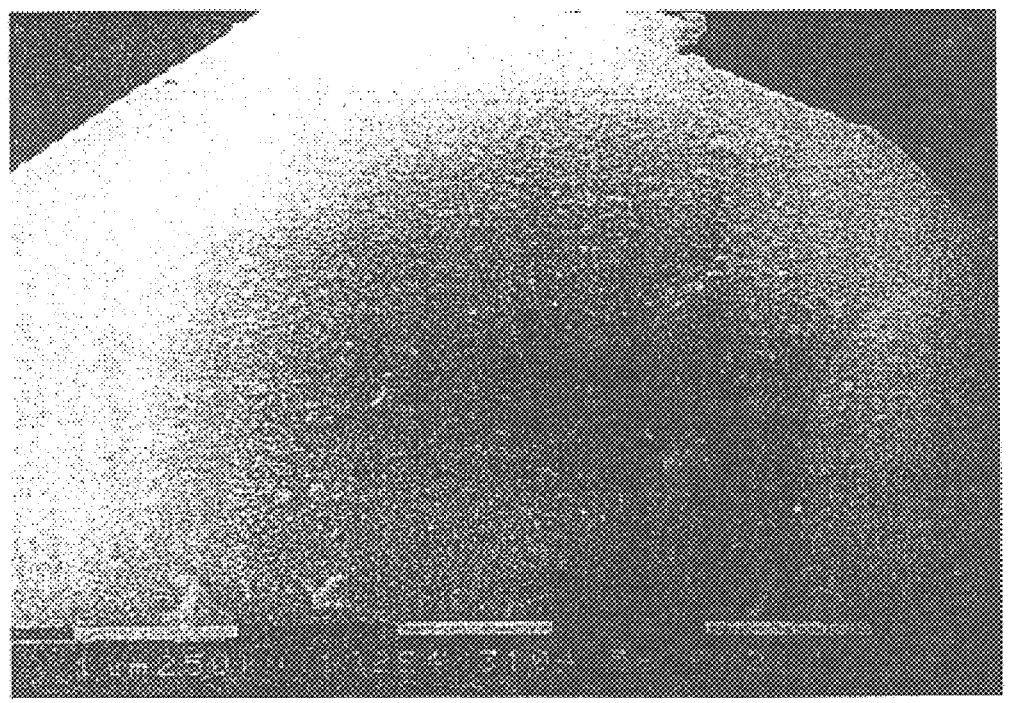
FIG. 2 shows SEM recordings of a ZnS:Cu,Au,Al-phosphor which is for comparison coated with ionic potassium silicate and ZnO.

Analysis by means of a scanning electron microscope (SEM) shows that the surface morphologies of the two phosphor particles coated in accordance with different methods differ substantially. The use of the coarse-grained $SiO_2$-colloid in accordance with the invention leads to a surface with a well-defined structure and with isolated or weakly agglomerated particles on an otherwise uninfluenced surface of the phosphor particle (FIG. 1), whereas the use of ionic silicate leads to a diffuse, film-like, dense surface covering with scattered large agglomerates (FIG. 2).

Figure 3:
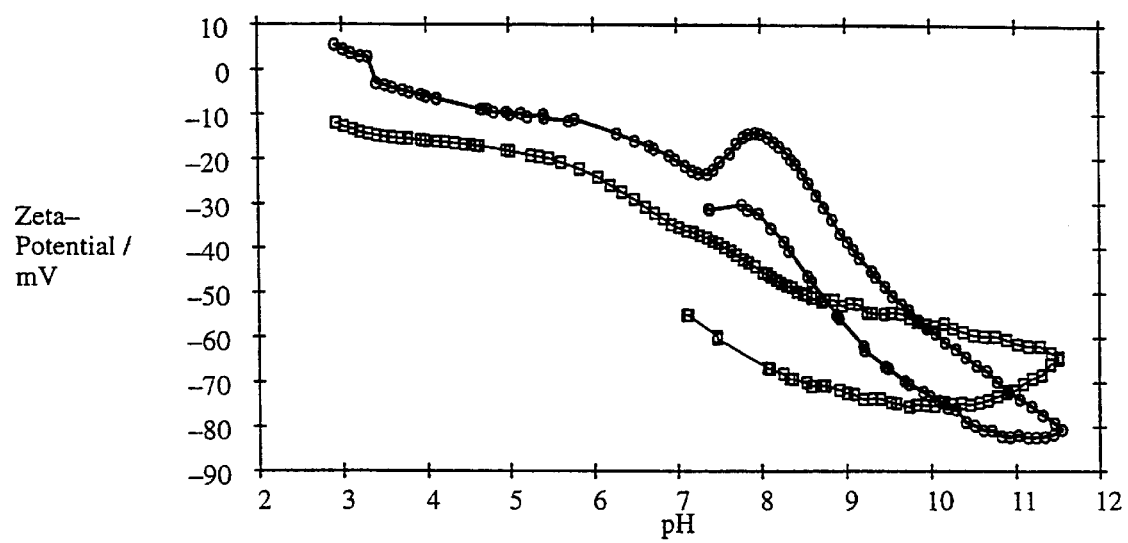
FIG. 3 shows the zeta potential as a function of the pH-value of a ZnS:Cu,Au,Al-phosphor coated with a monodisperse $SiO_2$ colloid having a particle size of 100 nm and with ZnO (curve ○), and the zeta potential, as a function of the pH-value, of a ZnS:Cu,Au,Al-phosphor which is coated with for comparison ionic potassium silicate and ZnO (curve □).

In addition, ESA-measurements (electrosonic amplitude) were carried out to investigate the electrokinetic behaviour by means of the zeta potential. As shown in FIG. 3, the phosphor composition in accordance with the invention (curve ○) exhibits a more positive zeta potential than the reference example (curve □) in the pH-range from 3 to 9.5. In the pH-range which is important for the "flow-coating" process, i.e. the range from pH=7.5 to pH=8.5, this difference even reaches a value of 30 mV, which, on the basis of a relative maximum of the zeta potential at 7.9, is the highest possible value. In the case of the ZnS-phosphor treated with ionic $SiO_2$, a more pronounced hysteresis between the first titration from the neutral range to the alkaline range and the subsequent back titration to the acid range indicates, in addition, that the precipitate $Zn(OH)_2$/ZnO exhibits a more selective dissolution behavior and hence that the phosphor composition in accordance with the reference example has a greater instability than the phosphor composition in accordance with the invention.

In addition, the filterability, sediment volume, solidity of the sediment, sensitivity of the particle size distribution of the suspension to ultrasonic treatment and haze-formation were compared; the results are listed in Table 1.

TABLE 1

| Property | Invention | Reference |
| --- | --- | --- |
| filterability of the suspension ml/15 s | 610 | 30 |
| sedimentation volume of 100 ml suspension in 24 h/ml solid matter | 14 | 16 |
| relative compactness of the sediment after sedimentation for 24 h | Semi-compact | incompact |
| deviation of the average particle size in the suspension from the initial value (in μm) after an ultrasonic treatment for 1 minute | 0,080 | 0,733 |
| haziness | no | strong |

Differences in the sensitivity to light of the suspension and in the adhesive of the phosphor layer on the glass of strength the display screen in irradiated screen regions were also found. For example, the minimum quantity of radiation at which a phosphor dot or line, after its development, still has sharp contours, is higher for a phosphor composition in accordance with the reference example, and the specific phosphor weight, with respect to the coating surface, is lower as compared to the phosphor composition in accordance with the invention.

We claim:

1. A display screen having a phosphor layer comprising a phosphor composition of a phosphor coated with an oxygen compound of one of the elements magnesium, calcium, barium, zinc and aluminium, and with colloidal $SiO_2$ having an average particle size of 70 nm$\leq$d$\leq$130 nm.

2. A display screen having a phosphor layer as claimed in claim 1, characterized in that the oxygen compound is a zinc-oxygen compound.

3. A display screen having a phosphor layer as claimed in claim 1, characterized in that the coating comprises a zinc-oxygen compound and colloidal $SiO_2$ in the molar ratio of 5:2 to 1:20.

4. A display screen having a phosphor layer as claimed in claim 1, characterized in that the colloidal $SiO_2$ has a monodisperse particle size.

5. A display screen having a phosphor layer as claimed in claim 1, characterized in that the coating contains a color-filter pigment.

6. A display screen having a phosphor layer as claimed in claim 1, characterized in that the phosphor composition contains a color-filter pigment in a separate coating.

7. A phosphor composition of a phosphor coated with an oxygen compound of one of the elements magnesium, calcium, barium, zinc and aluminium, and with colloidal $SiO_2$ having an average particle size of 70$\leq$d$\leq$130 nm.

8. A method of manufacturing a phosphor composition as claimed in claim 7, in which a) in a wet-chemical grinding process, the phosphor is dispersed in an aqueous suspension of an ionic silicate, b) the aqueous solution of a monodispersed or polydispersed $SiO_2$ colloid having a particle size of 70$\leq$d$\leq$130 nm is added to the phosphor-suspension thus obtained, c) the aqueous solution of a salt of one of the elements magnesium, calcium, barium, zinc and aluminium, and an oxo acid of the phosphor-suspension are added, d) the pH-value of the phosphor suspension is increased to pH$\geq$9 by means of an ammoniac solution, e) the phosphor suspension is washed, filtered and dried.

* * * * *